(12) United States Patent
Jousse

(10) Patent No.: US 7,419,415 B2
(45) Date of Patent: Sep. 2, 2008

(54) GLASS SUBSTRATE PROVIDED WITH EMBOSSED GLASS ELEMENTS

(75) Inventor: Didier Jousse, Taverny (FR)

(73) Assignee: Saint-Gobain Glass France, Courbevoie (FR)

( * ) Notice: Subject to any disclaimer, the term of this patent is extended or adjusted under 35 U.S.C. 154(b) by 767 days.

(21) Appl. No.: 10/450,449
(22) PCT Filed: Nov. 28, 2001
(86) PCT No.: PCT/FR01/03756

§ 371 (c)(1),
(2), (4) Date: Jun. 19, 2003

(87) PCT Pub. No.: WO02/051760

PCT Pub. Date: Jul. 4, 2002

(65) Prior Publication Data

US 2004/0045321 A1 Mar. 11, 2004

(30) Foreign Application Priority Data

Dec. 22, 2000 (FR) .................... 00 17362

(51) Int. Cl.
H01J 9/00 (2006.01)
H01J 9/24 (2006.01)
H01J 17/49 (2006.01)

(52) U.S. Cl. .................... 445/24; 445/25; 313/582; 313/584; 313/587

(58) Field of Classification Search ................ 313/582; 65/183, 184; 349/32; 428/1.1
See application file for complete search history.

(56) References Cited

U.S. PATENT DOCUMENTS

| | | | | |
|---|---|---|---|---|
| 3,425,454 A | | 2/1969 | Eakins | 138/141 |
| 3,622,298 A | | 11/1971 | Machlan | 65/31 |
| 5,354,397 A | * | 10/1994 | Miyake et al. | 428/420 |
| 5,757,131 A | * | 5/1998 | Tsuchiya | 313/582 |
| 5,840,461 A | * | 11/1998 | Haneda et al. | 430/133 |
| 5,990,854 A | * | 11/1999 | Weber | 315/111.31 |
| 6,385,998 B1 | * | 5/2002 | Mizuno | 65/105 |
| 6,674,238 B2 | * | 1/2004 | Otani et al. | 313/582 |
| 6,703,782 B2 | * | 3/2004 | Otani et al. | 313/584 |

FOREIGN PATENT DOCUMENTS

FR 2 788 267 7/2000
JP 09213215 A * 8/1997

* cited by examiner

Primary Examiner—Sikha Roy
Assistant Examiner—Natalie K Walford
(74) Attorney, Agent, or Firm—Oblon, Spivak, McClelland, Maier & Neustadt, P.C.

(57) ABSTRACT

A glass substrate including raised glass elements placed over part of an area of the glass substrate, wherein the glass elements are intrinsically incorporated into the glass substrate. Advantageously, the glass substrate is used in a plasma screen for which the front face includes a first electrode array and the rear face, which includes the glass substrate, includes a second electrode array approximately perpendicular to the first array and placed on the external face of the glass substrate, opposite the space lying between the glass elements, while phosphors occupy, surfacewise, the space lying between the glass elements.

31 Claims, 3 Drawing Sheets

GLASS SUBSTRATE PROVIDED WITH EMBOSSED GLASS ELEMENTS

The invention relates to a glass substrate provided with raised glass elements placed over part of its area.

Although not limited to such an application, the invention will be more particularly described in the case of glass substrates with reference to the production of a flat emissive screen, and more precisely a plasma screen. Other uses, such as for FED screens or plane lamps, may also be envisioned. The expression "plane lamp" should be understood as encompassing lamps intended for the manufacture of portable computers and lamps of larger dimensions for architectural applications, such as for the production of advertising panels or of partitions, for example in offices, whatever the technology of these lamps.

A plasma screen is essentially composed of two plane glass substrates. Deposited on at least one of the substrates are one or more electrode arrays, a layer of a dielectric material and layers consisting of phosphors corresponding, for example, to the colors green, red and blue. Before being joined together, the glass substrates also receive barriers, the functions of which are to form a multitude of cells, which isolate the phosphors from one another, and to keep the two glass substrates a certain distance apart.

The barriers, also called ribs, are produced independently of the glass substrates and attached to the substrate. The ribs are obtained by depositing a glass frit joined to one of the substrates by a process which has, however, slow steps, such as sandblasting and screen printing, and complex and expensive steps requiring, in particular, the recycling of the dust generated during the sandblasting step, which is not without creating a few pollution problems.

Moreover, it has been noticed that the phosphors suffer functional degradation due to the deposition on the ribs of impurities generated during the process for obtaining the ribs.

Furthermore, to ensure proper operation as regards the ignition voltages of the electrodes, it is necessary to cover the electrodes with a dielectric, the deposition of which constitutes an additional step, which goes counter to the ever desired aim of improving the production costs.

The object of the invention is therefore to propose a glass substrate provided with raised glass elements so as especially to constitute ribs which do not have the drawbacks of the prior art and allow cost savings to be made in the manufacture of products using such a substrate.

According to the invention, the glass substrate comprising raised glass elements over part of its area is characterized in that said glass elements are intrinsically incorporated into the substrate.

Preferably, the body of the substrate has two opposed parallel faces, the elements being incorporated into at least one of the two faces.

According to one feature, the glass elements lie along at least one line approximately parallel to one side of the substrate; they may form at least one continuous wall or form isolated studs. Preferably, they form uniformly spaced parallel lines with a pitch p which may vary from 0.2 to 30 mm, going from near one edge of the substrate as far as the opposite edge.

According to another feature of the invention, the cross section of the elements may adopt various forms. Thus, the cross section is, for example, of triangular shape, the base of the triangle being incorporated into the substrate. It may also have a concave curved geometry at the body of the substrate and a substantially straight neck at the top. As a variant, the cross section is in the form of an arch, so that the volume constitutes a semicylinder.

According to other features, the height of these elements may vary from 0.15 to 12 mm, the top of these elements may form a flat whose width is less than 500 μm, whereas their base may have a width of 50 μm to 50 mm.

One way of using the structured substrate of the invention is, in particular, as a plasma screen which comprises said structured substrate constituting the rear face of the screen, and a flat substrate constituting the front face of the screen, the flat substrate being provided on its internal face facing the internal face of the structured substrate with a first electrode array, the plasma screen being characterized in that a second electrode array approximately perpendicular to the first array is placed on the internal face of the structured substrate in the space lying between the raised elements, while a dielectric covers said second electrode array and phosphors are housed in said space above the dielectric.

According to a plasma screen variant, the second electrode array on the rear face approximately perpendicular to the first array on the front face is placed on the external face of the structured substrate and opposite the space lying between the raised elements, while phosphors occupy, surfacewise, the space lying between the raised elements.

In this plasma screen variant, the rear face electrodes are advantageously placed on the external face of the substrate, that is to say outside the screen and not inside the screen. There are many advantages to this:
  there is no longer a need for a dielectric for this electrode array as the thickness of the substrate provides the dielectric function;
  once the screen has been assembled, it is always possible to carry out a repair on the electrodes;
  one of the sources of internal contamination of the screens, due to evaporation and incomplete combustion of the organic compounds constituting the binders for screen-printing the electrodes, is eliminated as is also the risk of contaminating the phosphors with the electrode materials of Ag type.

Finally, according to the latter screen variant, and in particular when the raised elements have a flat at their top, a third electrode array parallel to the second array may be provided, placed on the external face of the substrate and opposite the tops of the raised elements, while phosphors occupy, surfacewise, the space lying between the raised elements.

The structured substrate of the invention, in particular in its use for a plasma screen, comprises a multitude of walls, constituting the ribs, which are mutually parallel and extend from one edge of the substrate to the opposite edge, the two lateral walls of the two respective edges of the substrate being of larger width than the intermediate walls so as to provide a bearing surface of sufficient contact in this peripheral region for sealing the two substrates of the screen.

The structured substrate of the invention may, of course, be used in other embodiments, it being possible for the raised elements to constitute simple spacers between two walls, whether, for example, between two faces of an FED screen for example, or between bottom and cover of a plane lamp.

According to the invention, the process for manufacturing the structured substrate is characterized in that the substrate is obtained by extrusion, flat glass being introduced under high pressure into a die heated so that the glass reaches a temperature close to the softening temperature.

Preferably, glass is extruded by means of a die in order to form an intermediate substrate incorporating raised elements, which substrate has a cross section substantially identical in shape to that which it is desired to obtain, to within a homothetic ratio, and then the intermediate substrate is drawn in order to constitute the final substrate of desired cross section.

More specifically, flat glass is introduced into the die which is heated so that the glass reaches a temperature close to the softening temperature, the bottom of the die being machined so as to have the cross section of the intermediate substrate to be delivered by extrusion on leaving the die, and then the intermediate substrate is drawn by drawing means with a draw ratio (f) at the temperature close to the softening of the glass.

In a process variant, it is possible for the drawing to take place in the die.

This extrusion-forming process allows very precise dimensional control of a few thousandths of the objects formed, which, combined with a homogeneous defect-free glass composition, ensures precise control of the electrical capacitance formed by the electrode and the dielectric.

This results in greater uniformity, pixel to pixel, of the voltages for igniting the ion discharge, since this uniformity is in fact dependent on the exact height of the rib, on the centering of the electrode with respect to the phosphor and on the thickness of the dielectric.

Further features and advantages of the invention will become apparent on reading the description which follows, in conjunction with the appended drawings in which.

Figure 6:
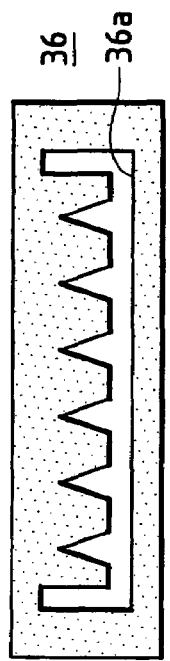
Figure 7A:
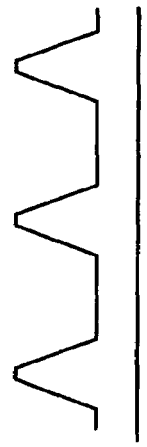
Figure 7B:
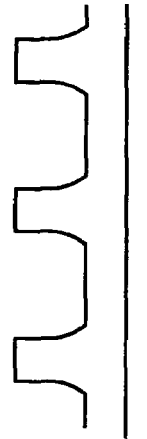
Figure 5:
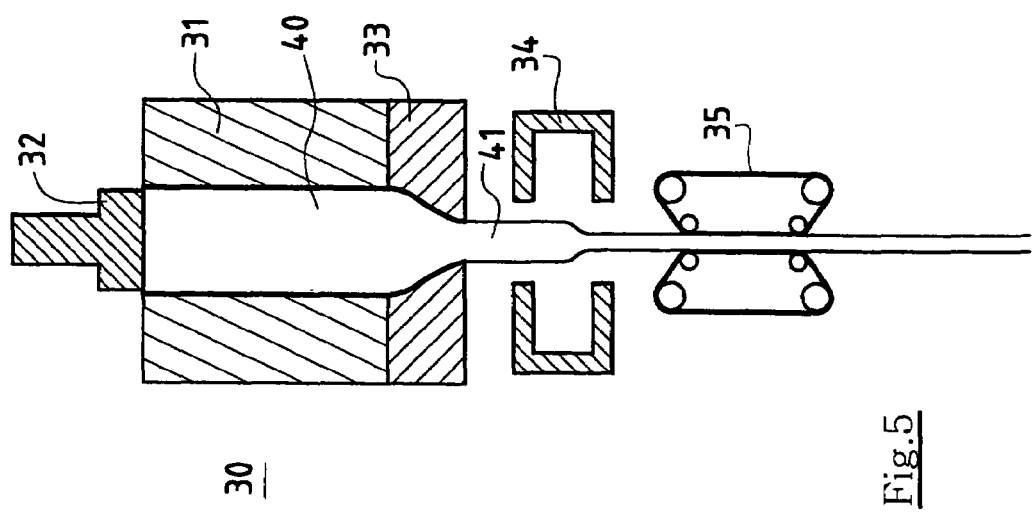
Figure 8:
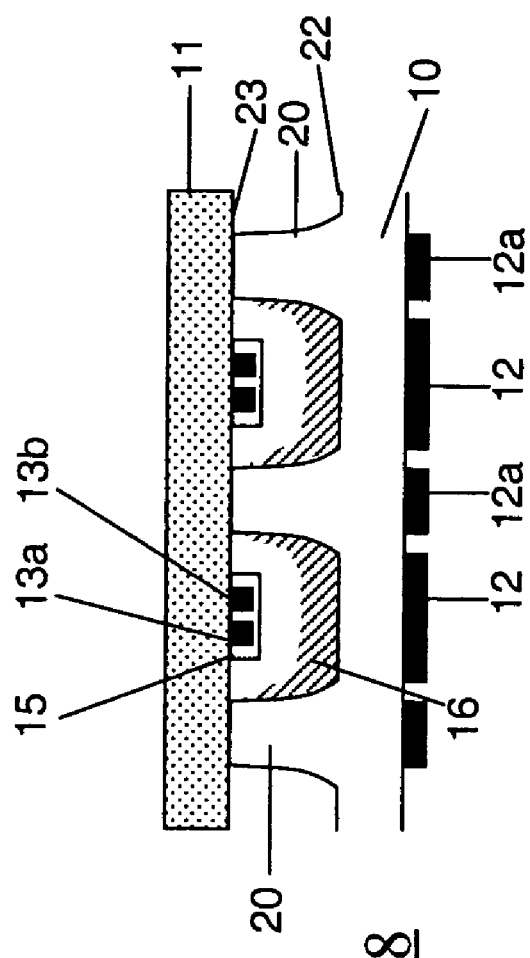
Figure 9:
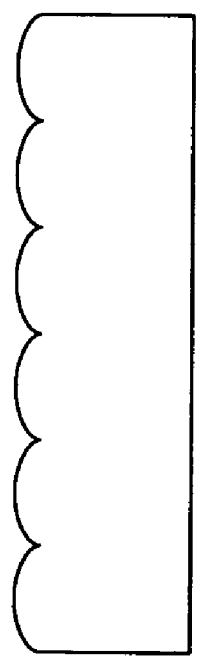

FIG. 5 diagrammatically illustrates an apparatus for implementing the process for obtaining a structured substrate according to the invention;

FIG. 6 is a sectional view from above of the bottom of the die illustrated in the apparatus of FIG. 5;

FIGS. 7a to 7d partially illustrate in cross section several geometrical variants of the raised elements incorporated into a substrate of the invention;

FIG. 8 is a partial schematic sectional view of a plasma screen according to the invention based on the geometry of the substrate illustrated in FIG. 7b; and FIG. 9 is an additional geometrical variant of the raised elements.

Figure 1:
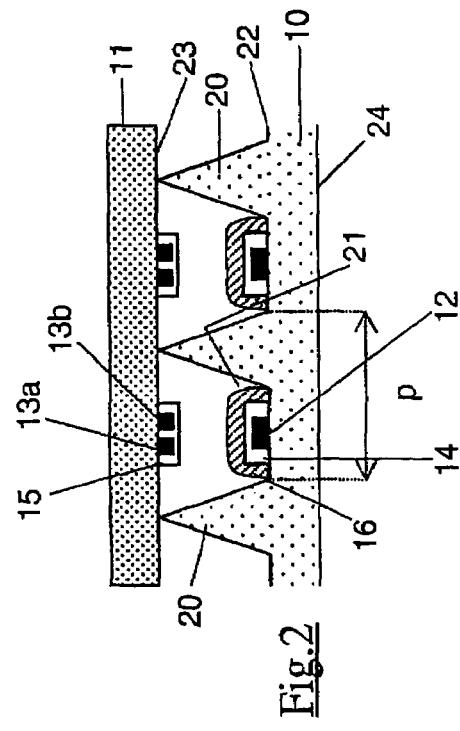
FIG. 1 is a partial schematic sectional view of a plasma screen of the prior art.

A known standard plasma screen as illustrated in FIG. 1 is composed of a first glass substrate 10 and a second substrate 11 which are parallel and placed facing each other in order to constitute the rear face and the front face of the screen, respectively. The substrates are flat, that is to say they do not have any particular element incorporated into their surface.

Placed on the respective internal faces 22, 23 of the substrates 10, 11, which faces of the substrates face each other, are layers constituting electrode arrays 12 and 13a/13b, respectively, which are placed so as to be mutually perpendicular, constituting what are called, respectively, the rows and columns of the screen which define the pixels.

The electrodes 12 on the rear face, for example made of silver, are covered with a dielectric 14 based on low-melting-point compounds, such as PbO, and the electrodes 13a and 13b, for example a layer of ITO, are covered with a dielectric 15, also based on PbO.

The electrodes 13a and 13b of the front face generally form double electrode tracks, that is to say pairs of two lines of electrodes spaced apart by about 70 to 80 µm and connected together.

The electrodes 12 of the rear face of the screen are also covered with a layer 16 of a phosphor. Each phosphor, of red, green or blue color, is separated by glass-based elements 20 of the "rib" type which extend in the form of continuous walls over almost the entire length of the substrate 10 along a multitude of lines parallel to the longitudinal edges of the substrate and are positioned uniformly with a pitch p of 0.3 mm for example, which depends on the size of the screen and on its resolution. The sides of the ribs are also partially covered with phosphors, that is to say down to the level of the thickness of the electrodes.

The volume 17 created between the two substrates 10 and 11 and in the channels 21 bounded by the ribs 20 is filled with a gas, for example a mixture of neon and xenon. During operation of the screen, the gas mixture is excited by applying suitable voltages to the electrodes 12, 13a and 13b, thereby generating $Xe^+$ and $Ne^+$ ions emitting UV photons. The UV photons then excite the phosphors, which convert the excitation energy into red, green or blue visible light.

Figure 2:
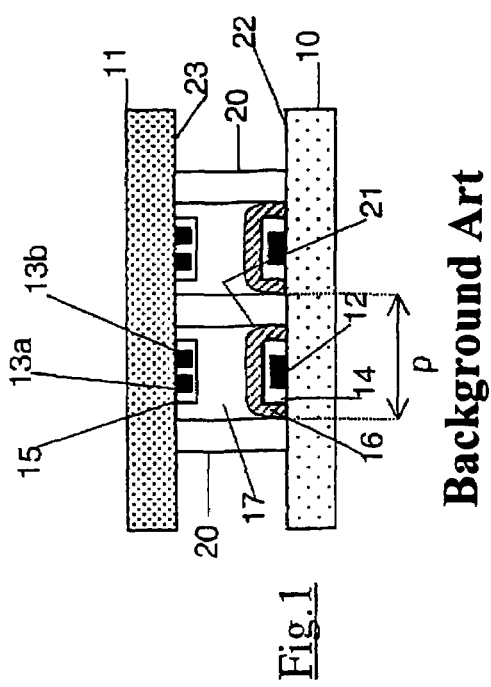
FIG. 2 is a partial schematic sectional view of a plasma screen according to the invention.
Figure 3:
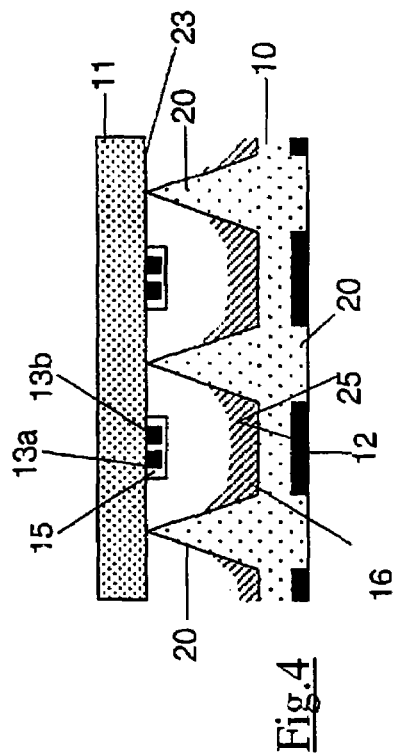
FIGS. 3 and 4 are alternative embodiments of FIG. 2.
Figure 4:
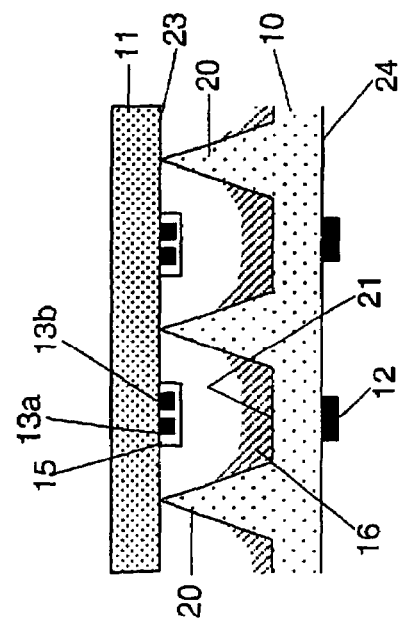

Three plasma screen variants using the structured substrate of the invention are illustrated in FIGS. 2 to 4 respectively; the elements common to the prior art are identified by the same reference numbers.

FIG. 2 reproduces the same arrangement of the electrodes as that in FIG. 1 on the front and rear faces of the screen, the phosphors being isolated by the ribs which, not being attached as in the prior art, form an integral part of the substrate 11. The ribs lie along several uniformly spaced parallel lines of pitch p. The electrodes 12 of the rear face of the screen are placed in the channels 21 bounded by the ribs 20, a dielectric layer 14 covering them and on the top of these layers are the phosphors 16.

The variant in FIG. 3 benefits from the novel configuration of the structured substrate of the invention, providing a different arrangement of the rear electrodes 12. These electrodes are placed so as to face the channels 21 bounded by the ribs 20, and on the outside of the glass substrate 10 on the external face 24. No dielectric layer of the layer 14 type of the prior art for these electrodes is then necessary as the glass thickness of the substrate 10 very advantageously fulfills the role of dielectric.

Although in the variants in FIGS. 2 and 3 the glass elements are incorporated on only one 22 of the faces of the substrate, in another embodiment of the substrate, in particular for a plasma screen, it may be advantageous to form elements 20 on the two opposed faces 22, 24 of the substrate, as illustrated in FIG. 4.

The raised features 20 on the face 24 are at least opposite the sides of the walls on the face 22 so that grooves 25 are created on the opposite side from the cups of the face 22 so as to house the electrodes 12, made of Ag paste, on the rear face. This configuration advantageously provides an impression which can directly receive conductive paste deposited by a squeegee, thereby making savings on the supply of screen-printing screens and on the material of the electrodes.

The process for obtaining a substrate according to the invention, which intrinsically incorporates the rib-type glass elements 20 will now be described. The process for manufacturing a plasma screen will be explained later so as to demonstrate the possibilities of its implementation, which is provided by a substrate structured in this way.

The process for obtaining the substrate according to one embodiment is explained with regard to the apparatus 30 diagrammatically illustrated in FIG. 5, which is a sectional view in a plane perpendicular to the plane of the glass ribbon. The apparatus 30 comprises a furnace 31, a piston 32 for driving the glass, a die 33 capable of extruding an intermediate glass ribbon 41, a thermal regulation system 34, which gives the intermediate ribbon the temperature suitable for drawing it, a system 35 for drawing the ribbon, in order to deliver a final ribbon to the desired dimensions, and cooling means (not visible in the figure).

A flat glass strip 40, such as bubble-free float glass containing no solid defects, is introduced under pressure by means of the piston 32 into the furnace 31 and the die 33. The thickness of the glass may vary from 5 to 20 mm depending on the availability of the base material used and on the final application of the structured substrate. The die is heated so that the temperature of the glass can reach the softening temperature. The bottom 36 of the die is made of graphite for reasons of resistance to abrasion by the glass.

The die bottom 36, illustrated in FIG. 6, is provided with a cut 36a, the pattern of which is similar to the cross section of the final substrate to be obtained, to within a homothetic ratio. Advantageously, it can be demounted from the body of the die so as to be able to change it easily in order to adapt the type of pattern to the desired profile of the substrate.

Several variants of patterns obtained for the glass elements 20 are proposed in FIGS. 7a to 7d as nonlimiting examples.

FIG. 7a illustrates one form of prismatic ribs having a triangular cross section, the base of the triangle being incorporated into the substrate. The vertex of the triangle is preferably truncated in order to avoid the spike effect during operation of the electrodes.

The cross section of the ribs in FIG. 7b has, on the one hand, a concave curved geometry at the body of the substrate, such that it is composed of two curves of the exponential type which are symmetrical with respect to an axis perpendicular to the plane of the substrate and, on the other hand, a substantially straight neck at the top. The radius of curvature of the concave part may vary from 5 to 100 μm.

Figure 7C:

The ribs in FIG. 7c have a cross section in the form of an arch, such that the volume of the ribs constitutes a semicylinder.

It may be envisioned to combine ribs 20 of different cross sections on the same substrate.

Figure 7D:
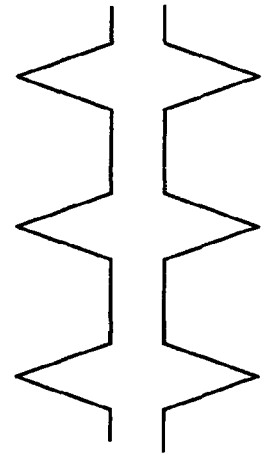

In the variant in FIG. 7d, there are raised elements on both faces of the substrate, these being symmetrical with respect to the plane of the body of said substrate. Such a configuration allows symmetrical cooling during the process of forming said substrate and will increase the ability of the screen to dissipate heat during operation, thanks to the effect of fins provided by the raised elements.

On leaving the die, the extruded intermediate substrate ribbon 41 has the cross section of the final substrate ribbon 42 to within a homothetic ratio. It is then drawn by the drawing means 35 by passing, immediately downstream of the die, through the thermal regulation system 34 which has the purpose of controlling and adapting the temperature over the entire width of the ribbon, which has, because of its dissymmetrical profile, points of variable temperature. The temperature of the ribbon, which has to be the softening temperature, must be perfectly homogeneous over the entire width of said ribbon in order to guarantee a constant draw ratio f over the entire width of the strip.

The draw ratio f may vary from 1 to 20 depending on the final application.

Finally, the cooling system through which the final substrate strip 42 passes allows the definitive shape of the substrate to be set.

Conventional flat-glass cutting means (not illustrated), or any other suitable means such as a laser, are provided for cutting the strip 42 along its width so as to supply structured substrates 10 to the desired lengths.

The substrates thus delivered will constitute the rear faces of plasma screens, the body of the substrate having, for example, a thickness of 1 mm and the glass elements being 150 μm in height.

The plasma screen of the invention as illustrated in FIG. 3 is manufactured in the following manner.

The structured substrate 10 is held by suction, using suitable means, in a horizontal position, its external face 24 devoid of ribs being turned uppermost. A uniform silver layer in the form of a paste is deposited by screen printing on this external face.

The silver paste is advantageously photosensitive so as to fix it by exposing the substrate to a UV beam. Consequently, when the layer has undergone the drying step, the substrate is turned upside down, with the internal face 22 provided with ribs turned uppermost, in order to receive the UV beam intended to sensitize the UV activators of the photosensitive silver paste.

The raised geometry of the substrate, defined homogeneously by the ribs 20 which form in succession the walls for isolating the colors and the channels 21 forming flat-bottomed cups intended to receive the phosphors, makes it possible to focus the UV rays all the better onto the bottom of the cup, so that the Ag electrodes 12 are, after development, positioned precisely along lines opposite the cups. No photomask is then needed as in the prior art, which represents an additional pecuniary saving in the manufacturing process. Furthermore, the wall/cup structure incorporated into the substrate and the method of depositing the paste ensure that, whatever the linearity of the ribs, the Ag electrodes are self-aligning, this being an essential characteristic for guaranteeing a high level of uniformity of the ignition voltages during operation of the screen.

The development of the electrodes 12 is carried out in a known manner by a wet route and is followed by a baking operation at high temperature of the order of 550° C.

The substrate with symmetrical raised features, as illustrated in FIG. 7d, makes it possible very advantageously to produce silver electrodes self-aligned with the ribs inside the screen, using a photosensitive silver paste, without the need for a photomask. To do this, all that is required is to deposit the photosensitive silver layer on the inside of the screen and to expose it to the ultraviolet rays via the opposed structured face, on the outside.

To obtain a region for sealing the two glass substrates, as will be explained below, the ribs of the lateral ends of the substrate are not used for depositing the electrodes and phosphors; their cross section may moreover be different from that of the intermediate ribs.

Immediately alongside these lateral end ribs may be reserved ribs for housing elements involved in the operation of the product, such as getters well known to those skilled in the art, these elements placed around the periphery of the image not having to be in contact with the phosphors, the plasma or the sealing frits.

In the geometrical variant of the ribs with reference to FIG. 7b, the flatness of the tops of the ribs results in the formation, on the external face 24 of the substrate and opposite said tops, of a second electrode array 12a parallel to the electrode array 12 placed opposite the cups (FIG. 8). The external face 24 is in this case plane, but it could just as well be structured as in FIG. 4; grooves would then be placed not only opposite the cups but also opposite the tops. This second electrode array allows, via a connection to the electrodes 12, rapid repair of the latter if they possibly become damaged.

The step following the deposition of the electrodes on the rear face of the screen consists in depositing the phosphors by electrophoresis, by biasing the electrodes. This technique is well known in the manufacture of television sets, the phosphors being deposited on the front face of the cathode-ray tubes. By biasing the electrodes on the face 24 of the substrate, the phosphors may thus be deposited on the bottom of the cups of the channels 21.

The voltage values applied to the electrodes are adjusted according to the particular geometry of the ribs.

The geometry of the ribs in FIG. 7*b*, which makes it possible to obtain two arrays of mutually adjacent electrodes, facilitates the deposition of the phosphors not only in the bottom of the cups but also on the sides of the walls.

After the phosphors have been dried, a sealing frit is put into place for the purpose of fastening together the two glass substrates of the screen. The structured substrate 10 is laid on a metal support fitted with suction and uniform-heating means. A sealing frit is applied around the periphery of the structured substrate 10, that is to say in the cups of the two lateral end ribs and along the two adjacent sides in the ends of the cups of the intermediate ribs.

Finally, the front face substrate 11, which has the electrodes 13*a* and 13*b* screen printed beforehand, is positioned over the structured substrate 10 resting on the top of the ribs, the electrodes 13*a* and 13*b* of the substrate 11 lying perpendicular to the electrodes 12 of the substrate 10. The entire screen is housed in a closed chamber in which a vacuum is created in order to evacuate between the substrates. Gas is then introduced into the screen via the gap lying between the two non-compressed substrates. The two substrates are then fastened together via the sealing frit by compressing and heating the assembly in the chamber, operating under a controlled atmosphere in order to guarantee a high level of temperature uniformity.

In order to benefit from the structure of the substrate with incorporated ribs, a variant in the substrate-fastening and gas-filling steps may be envisioned.

Thus, with regard to the sealing frit, this may be placed only on the two sides of the structured substrate 10 which will be placed vertically in the mounted position of the screen, that is to say along the sides parallel to the ribs, thereby allowing the channels 21 formed by the ribs to project freely. After placing the front face substrate 11 on the structured rear face substrate 10, the channels 21 of the ribs are connected by means of a sucker system to a vacuum, purging and filling device. The device carries out, in succession, the steps consisting in creating a vacuum in the channels, purging with an inert gas, such as argon and filling with the discharge gas. The free circulation of the fluids from one channel to another and the means of direct connection with said device shortens the time for carrying out these steps.

The resulting effectiveness is not insignificant since the operation goes from 24 hours in the case of the conventional gas introduction solution to a few hours in the case of this method of implementation, providing a substantial saving on the cost of assembling the screen.

Once filling with gas has been completed, the channels are closed by local heating and mechanical stamping of the edges of the two substrates that do not have a sealing frit. The other edges, associated with the sealing frit, are fastened together by compressing and heating said edges.

Similar operating steps with regard to the use of the structured substrate of the invention may be applied to other operations, such as the manufacture of plane lamps.

In a known manner, a plane lamp comprises two facing substrates which are held apart by means of spacers in order to form a space containing a discharge gas.

For a plane lamp according to the invention, one of the two substrates is flat while the other is structured, the raised glass elements 20 constituting the spacers. In a variant of the spacers, the glass elements are in the form of isolated studs obtained by sawing and grinding the continuous extruded ribs.

Of course, the structured substrate of the invention can be used in any application which either requires a space to be maintained between two glass walls, the glass elements 20 acting as spacers, or which gives the substrate a novel technical property.

For example, intended for the spacer function are FED screens and applications in the building industry where it is necessary to maintain a constant distance between two substrates. Mention may be made, for example, of vacuum double glazing or of double glazing in which it is desired to make a functional liquid circulate.

Consequently, the dimensions of the bases, tops and heights of the raised elements 20 and the pitch between the elements, together with the thickness of the body of the substrate, vary depending on the envisioned application of the structured substrate. The table below summarizes a few values for the applications, namely plasma screen, plane lamp, FED screen and building.

|  | Plasma | Plane lamp | FED | Building |
| --- | --- | --- | --- | --- |
| Thickness of the body of the substrate | 0.1 to 1 mm | 0.5 to 3 mm | 0.1 to 3 mm | 1 to 4 mm |
| Pitch p between the elements | 0.2 to 0.4 mm | 10 to 30 mm | 0.2 to 30 mm | 10 to 50 mm |
| Height of the elements | 150 µm | 0.5 to 5 mm | 0.4 to 3 mm | 0.2 to 12 mm |
| Width at the top | Less than 100 µm | Less than 200 µm | Less than 50 µm | Less than 500 µm |
| Width at the base | 50 to 400 µm | 100 µm to 30 mm | 50 to 200 µm | 200 µm to 50 mm |

With regard to the technical novelty that a substrate of the invention may provide, it may be envisioned to produce microlenticular panels which are attached to flat display screens so as to obtain a three-dimensional perception of the image. A microlenticular panel thus consists of a substrate according to the invention, which is flat on one of its faces intended to be placed on the screen, and structured on its opposite face with semicylindrical raised elements forming the lenses, as illustrated in FIG. 9. The thickness of the body of the substrate may be between 2 and 5 mm, the base of a raised element 20 or the pitch of the lenses may vary from 0.15 to 2 mm, and the radius of curvature of the semicylinders may be between 1 and 3 mm.

The invention claimed is:

1. A process for manufacturing a glass substrate comprising raised glass elements placed over part of an area of the substrate, the glass elements being intrinsically incorporated into the substrate, wherein the substrate is obtained:
   first by extrusion to form an intermediate substrate incorporating glass elements and having a cross section substantially identical in shape to a desired substrate shape, flat glass being introduced under high pressure into a die heated so that the glass reaches a temperature close to a softening temperature, and
   second by drawing said intermediate substrate exiting the die to constitute a final substrate of the desired cross section.

2. The process for manufacturing a substrate as claimed in claim 1, wherein the intermediate substrate has a cross section substantially identical in shape to the desired substrate shape to within a homothetic ratio.

3. The process as claimed in claim 2, wherein the die has a bottom machined to have the cross section of the intermediate substrate, and the intermediate substrate is drawn by a drawing device with a draw ratio at a temperature close to the softening temperature of the glass.

4. The process as claimed in claim 2, wherein the drawing takes place in the die.

5. A process for manufacturing a glass substrate having raised intrinsic elements, said method comprising:
   extruding glass through a heated die by introducing the glass under pressure into the heated die to form an intermediate substrate having a cross-sectional shape substantially identical to a desired final shape for the glass substrate having raised intrinsic elements; and
   drawing the intermediate substrate exiting the heated die to form the desired final shape for the glass substrate having raised intrinsic elements.

6. The process as claimed in claim 5, wherein the glass is introduced into the heated die under pressure by a piston.

7. The process as claimed in claim 6, wherein the heated die heats the glass within the die to a temperature close to a softening temperature of the glass.

8. The process as claimed in claim 6, wherein the intermediate substrate is drawn at a draw ratio of 1 to 20.

9. The process as claimed in claim 6, wherein the intermediate substrate is drawn using a drawing device located immediately downstream of the heated die.

10. The process as claimed in claim 6, wherein the intermediate substrate exiting the heated die passes through a thermal regulation system located immediately downstream of the heated die, and then passes through a drawing device for drawing the intermediate substrate.

11. A plasma screen comprising:
   a structured substrate including a planar base portion having a first surface and an opposing second surface, said structured substrate having raised elements extending from said first surface of said planar base portion, said raised elements being intrinsically incorporated into said structured substrate, said raised elements having distal ends, said raised elements defining a space therebetween above said first surface of said planar base portion;
   a planar substrate having a surface, said planar substrate being joined to said structured substrate such that said distal ends of said raised elements abut said surface of said planer substrate;
   a first electrode array provided on said surface of said planar substrate;
   a second electrode array provided on said second surface of said structured substrate at a location opposite the space between said raised elements; and
   phosphors housed in the space at a location between said first electrode array and said second electrode array.

12. The plasma screen as claimed in claim 11, wherein said structured substrate has additional raised elements extending from said second surface in a direction opposite of a extension of the raised elements of said planar base portion.

13. The plasma screen as claimed in claim 12, wherein said additional raised elements are intrinsically incorporated into said structured substrate.

14. The plasma screen as claimed in claim 13, wherein said additional raised elements are provided on said second surface extending in a direction opposite of an extension of the raised elements of said structured substrate, and located opposite said raised elements.

15. The plasma screen as claimed in claim 12, wherein said additional raised elements form a recess therebetween, and wherein said second electrode array is provided within said recess on said second surface of said structured substrate.

16. The plasma screen as claimed in claim 11, further comprising a third electrode array provided on said second surface of said structured substrate at a location opposite said raised elements.

17. The plasma screen as claimed in claim 16, wherein said third electrode array is arranged parallel to said second electrode array.

18. The plasma screen as claimed in claim 11, wherein said second electrode array is approximately perpendicular to said first electrode array.

19. The plasma screen as claimed in claim 11, wherein said first electrode array includes two spaced-apart lines of electrodes.

20. The plasma screen as claimed in claim 11, wherein said raised elements are continuous walls.

21. The plasma screen as claimed in claim 11, wherein said raised elements are studs.

22. The plasma screen as claimed in claim 11, wherein said raised elements have a triangular cross-sectional shape.

23. The plasma screen as claimed in claim 11, wherein said raised elements have a concave curved geometry adjacent said planar base portion and a substantially straight neck adjacent said distal ends.

24. The plasma screen as claimed in claim 11, wherein said raised elements have a cross-sectional shape in the form of an arch.

25. The plasma screen as claimed in claim 11, wherein said distal ends of said raised elements are flat.

26. A plane lamp comprising:
   a structured substrate including a planar base portion having a first surface and an opposing second surface, said structured substrate having raised elements extending from said first surface of said planar base portion, said raised elements being intrinsically incorporated into said structured substrate, said raised elements having distal ends, said raised elements defining a space therebetween above said first surface of said planar base portion; and
   a planar substrate having a surface; and
   an electrode array provided on said second surface of said structured substrate at a location opposite the space between said raised elements,
   wherein said planar substrate is joined to said structured substrate such that said distal ends of said raised element abut said surface of said planer substrate to form a space between said structured substrate and said planar substrate configured to contain a discharge gas.

27. The plane lamp as claimed in claim 26, wherein said structured substrate has additional raised elements extending from said second surface in a direction opposite of a extension of the raised elements of said planar base portion.

28. The plane lamp as claimed in claim 27, wherein said additional raised elements are provided on said second surface extending in a direction opposite of an extension of the raised elements of said structured substrate, and located opposite said raised elements.

29. The plane lamp as claimed in claim 27, wherein said additional raised elements form a recess therebetween, and wherein said second electrode array is provided within said recess on said second surface of said structured substrate.

30. A process for manufacturing a plasma screen based on the process as claimed in claim 1, further comprising:
   using the glass substrate for a plasma screen assembly.

31. A process for manufacturing a plasma screen based on the process as claimed in claim 5, further comprising:
   using the glass substrate for a plasma screen assembly.

* * * * *